Dec. 17, 1968   A. J. FAUSTINI   3,416,380
MICROMETER ADJUSTMENT LOCK
Filed Sept. 8, 1966   2 Sheets-Sheet 1
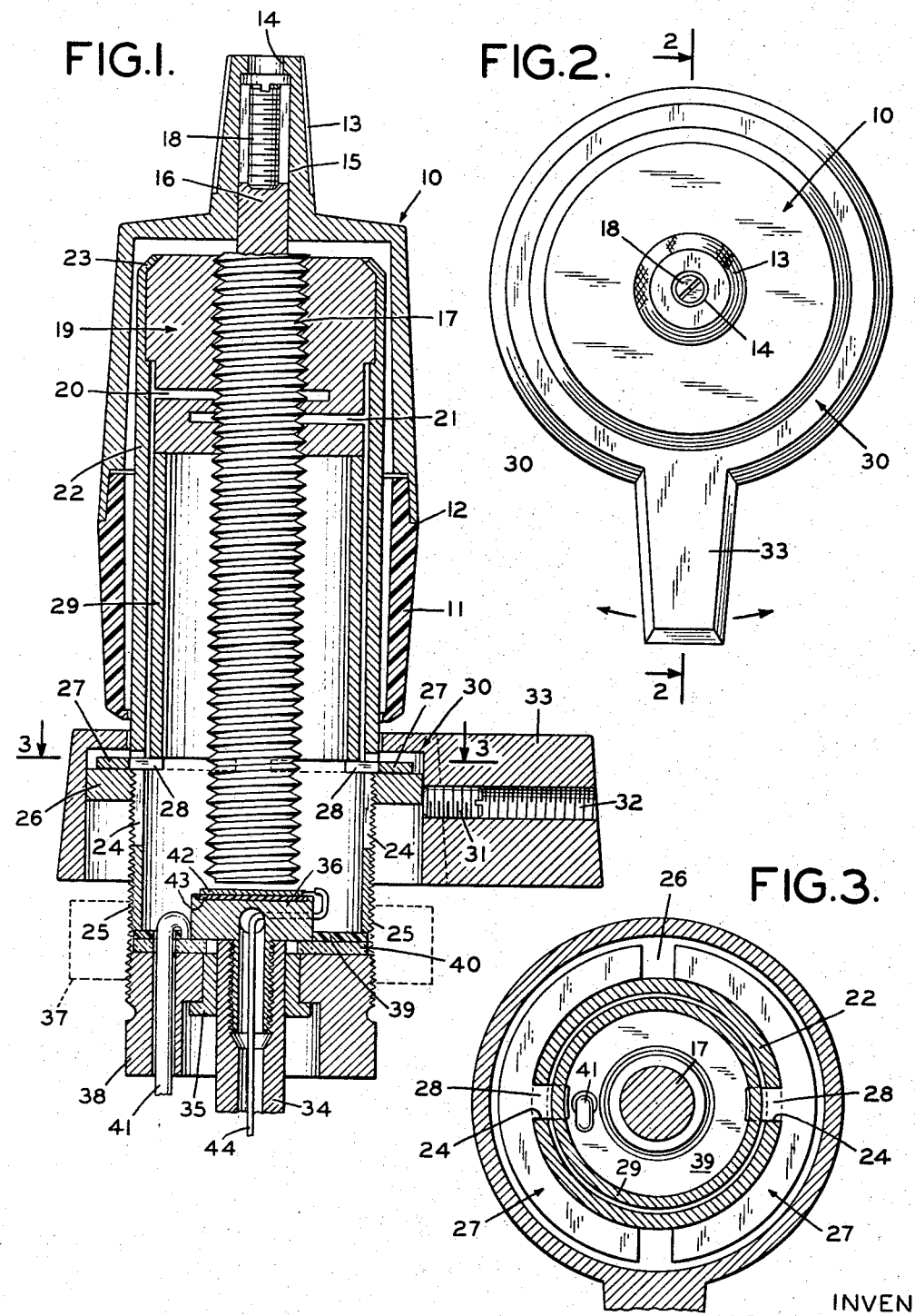
INVENTOR
ALBERT J. FAUSTINI
BY
Albert H. Graddis
ATTORNEY

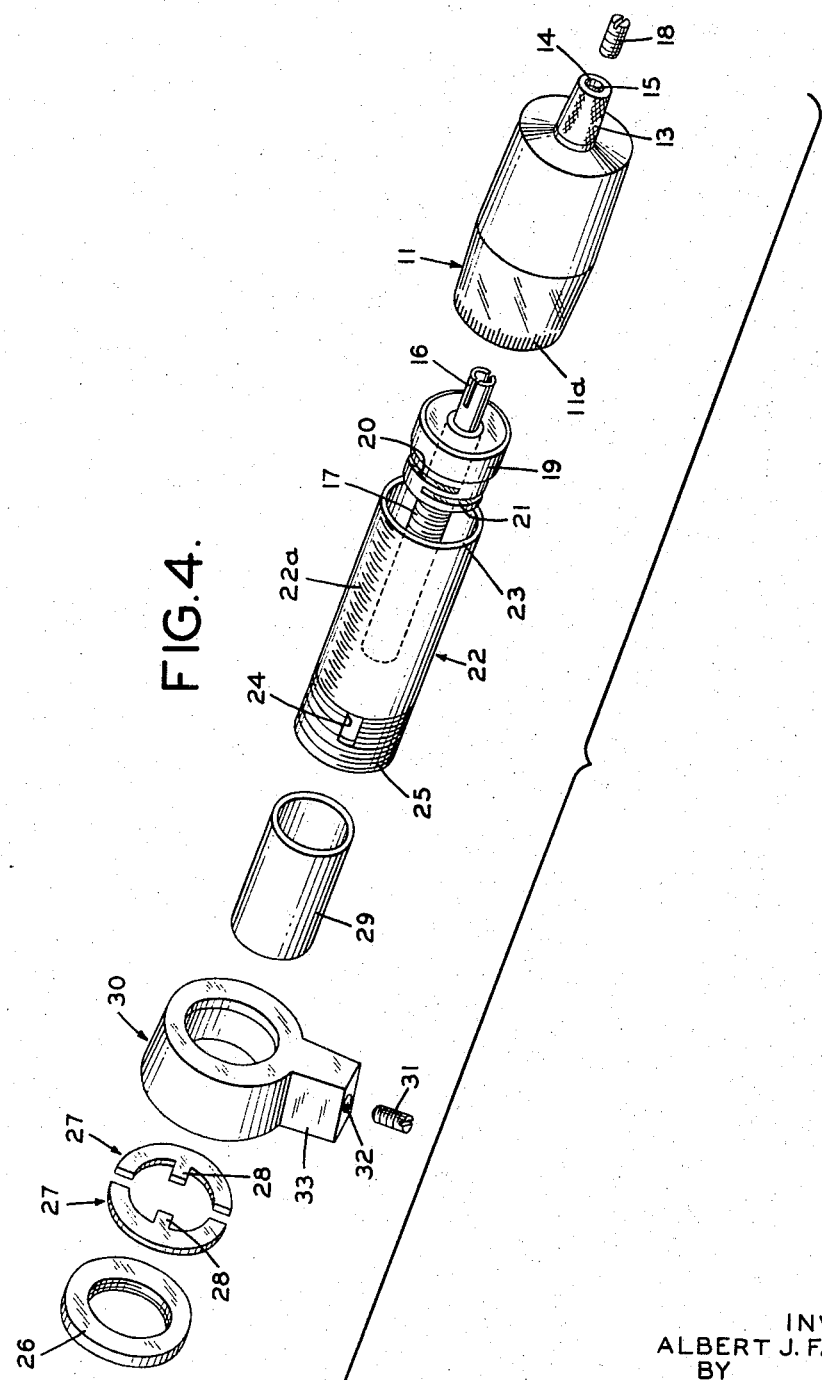

United States Patent Office 3,416,380
Patented Dec. 17, 1968

3,416,380
MICROMETER ADJUSTMENT LOCK
Albert J. Faustini, Oakland, Calif., assignor to Warner-Lambert Pharmaceutical Company, Morris Plains, N.J., a corporation of Delaware
Filed Sept. 8, 1966, Ser. No. 577,933
4 Claims. (Cl. 74—89.15)

The present invention relates to a micrometer adjustment for a piston pumping device and relates more particularly to means for locking a rotatable micrometer metering screw and jam nut carried on said metering screw in fixed position relative to each other. In the structure of the present invention the locking means provided is so constructed as to be readily disengaged to enable the metering screw and jam nut to be adjusted to any desired position by rotation of the metering screw relative to the jam nut and then to be readily engaged again to lock the metering screw and jam nut in adjusted position.

An object of this invention is to provide a micrometer adjustment and locking means for use in cooperation with a piston pump wherein the stroke length of the reciprocating piston determines the volume delivered by said pump.

Another object of this invention is the provision of a micrometer adjustment means including a rotatably mounted adjustable metering screw the adjusted position of which controls the length of stroke of the pump piston and wherein the adjustment means may be set readily to zero or set to any other position as desired.

Yet another object of this invention is to provide locking means including a split jam nut carried by an adjustable rotatably mounted micrometer metering screw whereby controlled pressure on said split jam nut locks the rotatably adjustable micrometer metering screw against further rotation and also serves to lock both the split jam nut and metering screw in fixed position relative to each other.

Other objects of this invention will appear from the following detailed description and the accompanying drawings.

In the drawings which for purposes of clarity show the device of this invention on an enlarged scale:

FIG. 1 is a vertical view, in section, taken along line 2—2 of FIG. 2, showing an adjustable metering screw and split jam nut in assembled position and in cooperation with a locking means for holding the metering screw and split jam nut in fixed position relative to each other during operation;

FIG. 2 is a plan view of the assembled elements;

FIG. 3 is a cross sectional view taken along the line 3—3 in FIG. 1 in the direction shown by the arrows; and FIG. 4 is an exploded view of the several structural elements which when assembled in operative position form the novel micrometer adjustment and locking means of this invention.

Like reference numerals indicate like parts throughout the several views of the drawings.

Referring now to the drawings and more particularly to FIG. 1, the micrometer assembly comprises a cap indicated by reference numeral 10 the lower part of which consists of a transparent plastic barrel 11 press fitted or cemented at the joint 12 to the lower or skirt portion of cap 10 and provided at its lower edge with an engraved vernier scale 11a. An upper portion of cap 10 is shaped to form a knurled handle 13 provided with a central hole 14. The inner portion of cap 10 forms a sleeve 15 adapted to receive the slotted internally threaded spindle 16 which is integral with a threaded rotatably mounted metering screw 17. Cap 10 is maintained on spindle 16 by means of a cap set screw 18 which is slightly tapered in a downward direction so that when it is threaded into and tightened down into spindle 16 by means of a suitable wrench (not shown) it forces the slotted halves of the spindle apart sufficiently to form a tight frictional fit. With the respective parts thus assembled, rotation of the knurled handle 13 and cap 10 causes the threaded metering screw 17 to be rotated in and relative to a jam nut 19 held in fixed position against rotation by suitable means. Jam nut 19 is provided with slots 20 and 21 cut partially through and on opposite sides of the nut as shown particularly in FIG. 4.

Slotted jam nut 19 is firmly held by friction in fixed position within a depending sleeve 22 so that it forms a unitary structure with said sleeve. The desired unitary structure may be achieved, for example, by peening the upper peripheral edge 23 of sleeve 22 over the upper periphery of slit jam nut 19 as shown at the top of FIG. 1. Sleeve 22 is provided with an outer vertical scale 22a calibrated to indicate the internal position of metering screw 17.

The lower portion of sleeve 22 is pierced by rectangular vertical slots 24 and is also threaded as shown in FIGS. 1 and 4 with the threads 25 extending upwardly along the length of sleeve 22 to a point just below the upper edge of vertical slots 24.

Carried by the threaded portion of sleeve 22 is an annular locknut 26 on which is seated a pair of semicircular locklinks 27 which are freely seated on locknut 26. Locklinks 27 are each provided with a finger 28 which projects through vertical rectangular slots 24 and together support a second cylindrical sleeve 29 within the outer sleeve 22.

When annular locknut 26 is rotated locklinks 27 which are seated on said locknut will be either raised or lowered depending upon the direction of rotation. The raising or lowering of locklinks 27 raises or lowers cylindrical sleeve 29 which rests on fingers 28. This movement raises cylindrical sleeve 29 upwardly toward split jam nut 19 or allows it to back away from said split jam nut 19. When cylindrical sleeve 29 is raised it bears against the lower surface of split jam nut 19. The pressure exerted flexes the split portions of the jam nut and the excessive friction produced acts to bind the jam nut and metering screw 17 against further movement relative to each other. An important part of this locking action is that the force on the screw is in the same direction as the force of the load.

The rotation of annular locknut 26 is effected by the clockwise or counterclockwise rotation of a locklever 30 which is held in fixed position relative to locknut 26 by means of a set screw 31 which is inserted through a threaded hole 32 in handle 33 of locklever 30 and then taken up by a suitable wrench (not shown).

The entire assembly of parts described above forms a unitary structure carried by sleeve 22. The lower threaded portion 25 of sleeve 22 constitutes the means whereby this unitary structure may be further assembled with those other structural elements with which it is desired to have rotatably mounted metering screw 17 cooperate. One such means may be, for example, a reciprocating rod 34 which is reciprocated by suitable means (not shown) in a sleeve bearing 35 and carries an anvil 36 mounted in the upper threaded end. In operation anvil 36 butts against the base of metering screw 17 at the end of its upward stroke so that any adjustment in the vertical position of metering screw 17 automatically adjusts the reciprocal stroke of rod 34.

By providing a suitably threaded collar 37 as shown in phantom in FIG. 1 the upper assembly of parts may be joined to the lower assembly of parts carried in a second externally threaded sleeve 38.

Thus, for example, where the lower assembly carried by sleeve 38 includes an electrical circuit in which a contact is made when anvil 36 reaches its lowermost position to provide a signal threaded sleeve 25 and sleeve 38 are separated by an insulating nylon washer 39 and an insulating ceramic washer 40 provided with a metal contact (not shown). This contact forms a connection in a make-and-break circuit through wire 41 which actuates the drive means (not shown) for raising the piston on command of the signal when the downward or discharge stroke of the piston is completed.

Anvil 36 carries an electrical contact 42 separated from the anvil by an insulator 43 and connected to an external control circuit (not shown) by wire 44. At the end of the upward stroke contact 42 and metering screw 17 meet to generate the signal that indicates the completion of the upward stroke.

The actuating means (not shown) provided can include a valved air cylinder in which air under pressure introduced into a chamber on one side of the piston will raise the pump piston causing the pump to fill and when the air flow is switched to the chamber on the opposite side of the piston the latter is forced downwardly to discharge the pump. The valve mechanism (not shown) for switching the air flow from one chamber to the other can be actuated by the electrical signal generated when the circuit is closed on the downward or discharge stroke.

Since the upward movement of the pump piston causes the pump chamber to fill and the upward movement of reciprocating rod 34 and anvil 36 are limited by the adjusted position of metering screw 17, the vertical adjustment achieved by rotating the metering screw 17 is utilized to determine the precise amount of material which will be discharged on the downward stroke.

This adjustment may be altered at will and the pump may be reset to any amount from zero discharge to maximum discharge but once the desired adjustment has been made it is essential that metering screw 17 be locked into adjusted position so that the amount that the pump is set to discharge will not be altered during prolonged operation unless and until it is desired to reset the pump.

In order to reset the pump locklever 30 is rotated to the left, as shown in FIG. 1, in a clockwise direction which rotates annular locknut 26 thus permitting locklinks 27 to drop and release the normally upward pressure exerted by finger 28 on inner cylindrical sleeve 29. When the latter is no longer in contact with split jam nut 19 the heavy frictional pressure previously exerted by cylindrical sleeve 29 on split jam nut 19 is released thus enabling metering screw 17 to be rotated.

To increase the amount discharged by the pump, knurled handle 13 is now rotated counterclockwise which rotates metering screw 17 relative to split jam nut 19 and thereby raises the lower end of metering screw 17. When metering screw 17 has been raised to the desired position handle 33 of locklever 30 is moved to the right and the resulting counterclockwise movement of annular locknut 26 raises fingers 28 thus causing cylindrical sleeve 29 to press upwardly on split jam nut 19. This pressure flexes split jam nut 19 thus causing the latter to bind with the resulting friction acting to lock the threads of metering screw 17 against any further rotation while the locking means is engaged.

Thus, the locking means can be engaged or disengaged at any setting of metering screw 17 and the volume of the pump discharge altered as desired. To provide a accurate measurement readings are taken on cooperating calibrated micrometer scale 22a and vernier scale 11a, the calibration provided being such that for each rotation of metering screw 17 the precise increase or decrease in the volume delivered by the pump can be read off directly.

The zero or base setting can be made quickly by releasing the locking means, rotating metering screw 17 clockwise until it touches anvil 36 set to its lowermost or pump discharge position and after releasing the cap set screw 18 and adjusting the cap to zero position on the micrometer and vernier scales tightening the cap set screw. By backing cap 10 off from the zero setting by rotating knurled handle 13 and with it metering screw 17 any desired pump discharge volume on the micrometer and vernier scales can be chosen. When the particular volume setting has been reached the handle 33 of locklever 30 is moved counterclockwise to the right thus activating the locking means so that the friction of split jam nut 19 on metering screw 17 prevents any further rotation.

It is understood that the foregoing detailed description is given merely by way of illustration and that many variations may be made therein without departing from the spirit of my invention.

Having described my invention, what I desire to secure by Letters Patent is:

1. In locking means for locking a rotatably adjustable threaded screw in a rotatably adjusted position, the combination with said rotatable screw of a slotted internally threaded nut carried on said screw, said nut being provided with at least one slot extending into the body of said nut and at least partially across said threads to permit the connected parts separated by said slot to be flexed relative to each other about the connection as a fulcrum and means comprising a reciprocable sleeve surrounding said screw and adapted to bear on said slotted nut for causing the connected parts separated by said slot to be flexed and thereby to produce sufficient friction to cause the binding of the threads of said screw and said nut against rotation relative to each other and to be locked by the frictional pressure produced.

2. Locking means in accordance with claim 1 in which said slotted internally threaded nut carried on said screw is provided with a plurality of slots spaced along the height of said nut.

3. Locking means in accordance with claim 2 wherein said sleeve is supported on a plurality of fingers and control means adapted to raise said fingers and sleeve thereby to lock said slotted nut and screw and adapted to lower said fingers and sleeve thereby to release the locking friction between said slotted nut and screw.

4. Locking means in accordance with claim 3 wherein said control means comprising a pivotally mounted lever attached to a second threaded nut on which said fingers are supported, the rotation of said lever and threaded nut in one direction raising said fingers and sleeve thereby to frictionally engage and lock said slotted nut and screw and the rotation of said lever and threaded nut in the other direction lowering said fingers and sleeve to release the locking friction between said slotted nut and screw.

References Cited

UNITED STATES PATENTS

| | | | |
|---|---|---|---|
| 2,367,259 | 1/1945 | Beach | 151—21 |
| 3,104,341 | 9/1963 | Fiedor et al. | 151—21 XR |
| 3,267,764 | 8/1966 | Berman | 151—21 XR |

FRED C. MATTERN, Jr., *Primary Examiner.*

F. D. SHOEMAKER, *Assistant Examiner.*

U.S. Cl. X.R.

74—424.8; 151—21